Nov. 16, 1948.  L. R. BEATH ET AL  2,453,775
METHOD OF CONCENTRATING WASTE SULFITE LIQUOR
WITH RECOVERY OF SULFUR DIOXIDE
Filed April 17, 1945  2 Sheets-Sheet 2
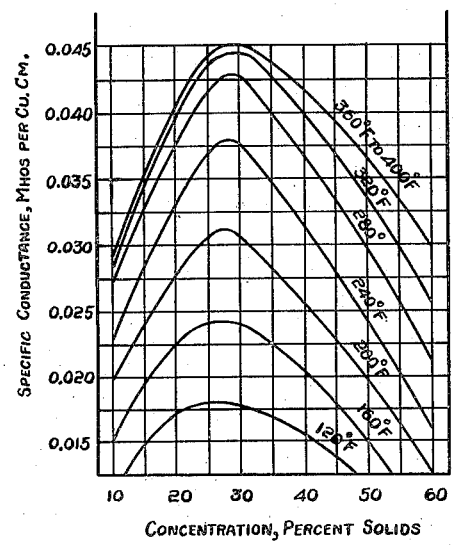
Fig. 2.
VARIATION OF SPECIFIC CONDUCTANCE OF
WASTE SULPHITE LIQUOR WITH
CONCENTRATION AT VARIOUS TEMPERATURES
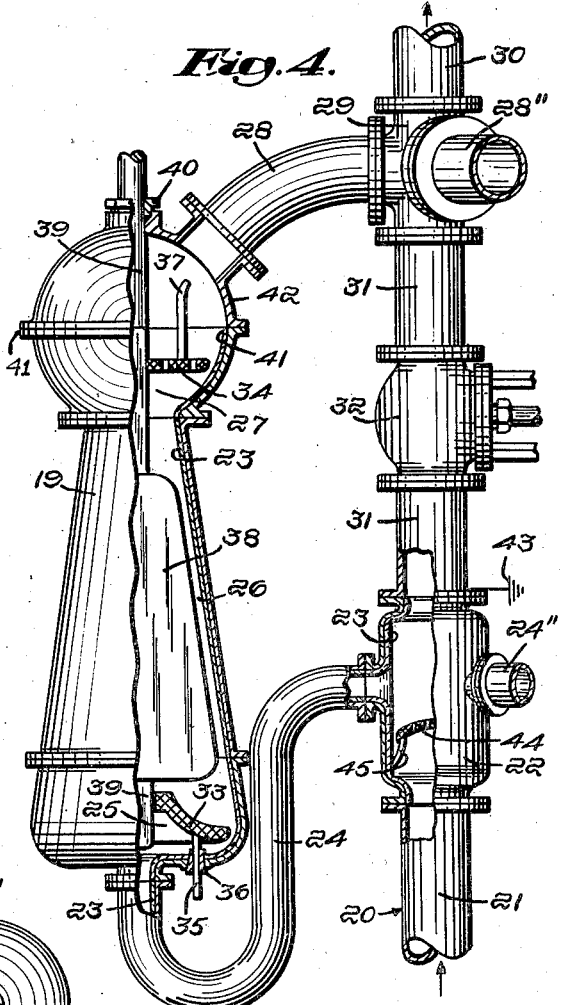
Inventors:
Lawrence R. Beath,
Harold S. Hill,
by Geo. B. Rawlings.
Attorney Patented Nov. 16, 1948

2,453,775

UNITED STATES PATENT OFFICE 2,453,775

METHOD OF CONCENTRATING WASTE SULFITE LIQUOR WITH RECOVERY OF SULFUR DIOXIDE

Laurence R. Beath and Harold S. Hill, Kenogami, Quebec, Canada, assignors to Price Brothers & Company, Limited, Quebec, Quebec, Canada, a corporation of Canada Application April 17, 1945, Serial No. 588,756

12 Claims. (Cl. 23—178)

The present invention relates to the concentrating of waste sulphite liquor and the recovery of sulphur dioxide by evaporative concentration of the dilute waste liquor from the sulphite pulp cooking process.

The production of one ton of pulp by the sulphite pulping process gives about ten tons of dilute waste liquor containing over a ton of dissolved wood substance plus spent and residual cooking chemicals. The potential economic value of waste sulphite liquor and the difficulty encountered, in some locations, in merely disposing of this large volume of waste material, have made its utilization the subject of a great amount of work. Although a fairly wide range of products now have their source in waste sulphite liquor, among them leather tanning agents, adhesives, vanillin, foundry core binder and plastics, these and other known products from waste sulphite liquor can absorb only a very small fraction of the total quantity available and are, furthermore, products of relatively high value which therefore justify manufacture by fairly expensive techniques. Profitable disposal of a significant proportion of the very large amounts of dilute waste liquor produced still awaits development of an inexpensive recovery process yielding a product which can find a large tonnage outlet.

Since waste sulphite liquor concentrated to 50% or higher solids content forms an excellent fuel, and since the organic solids in the quantity of liquor available have a potential heat content approximately equal to the heat required for cooking and drying the corresponding amount of pulp, a suitable large-tonnage outlet as fuel is available, provided that concentration can be effected inexpensively. For this reason much attention and effort have been directed to the concentration of waste sulphite liquor by evaporation to produce a low cost fuel. The well known processes of evaporation using a multiple effect evaporator, or a single effect evaporator with a thermocompressor, will theoretically, concentrate waste sulphite liquor to a burnable condition with an energy expenditure which is only a small fraction of that recoverable by burning the concentrate produced. However, this theoretically attractive method of recovering values from waste sulphite liquor has proven impractical heretofore due to acute difficulties arising from the deposition of scale on the heat exchange surfaces of the evaporators.

Most waste sulphite liquor is a mixed solution containing, among other things, the calcium salts of sulphuric and sulphurous acids. These salts have an inverted solubility curve, that is, they exhibit a decreasing water solubility with increasing temperature. By the usual methods of evaporation in which the heat required to evaporate the water is applied through hot surfaces in contact with the waste sulphite liquor, these salts with inverted solubility curves will precipitate from solution at the point of highest temperature, that is, where they are in contact with the heating surfaces, and will form a deposit on these surfaces. The temperature of the heating surfaces, increased due to the insulating effect of the deposit of calcium salts and occluded organic material, consolidates, dries and hardens the deposit into a scale which is extremely difficult to remove.

The formation of this waste sulphite liquor scale progressively reduces evaporative capacity as it accumulates, since its insulating properties retard the flow of heat to the solution. Capital costs of evaporator equipment are therefore increased by the need to provide oversize units in compensation for the reduction in capacity attendant on scale formation. Much more serious are the labor costs, material costs, and lost productive time incurred in the frequent scale removal operations. These high operating costs resulting from scaling difficulties have heretofore been the major factor in preventing realization of the theoretically possible low cost recovery of a valuable fuel product from waste sulphite liquor by evaporation.

The potential economic value of waste sulphite liquor will be apparent when it is realized that about 1.2 tons of wood substance dissolved in waste sulphite liquor are produced per ton of pulp, and that this waste liquor, if concentrated and burned, will yield heat equivalent to 0.6 ton of good coal. Assuming coal to have a value of $5.00 per ton, the heat value recoverable from the waste liquor is equivalent to about $3.00 per ton of pulp. This amount represents a significant proportion of the production cost and a major fraction of the usual profit on a ton of pulp.

Much of the cooking chemicals, which form a large item in the cost of production of sulphite pulp, are to be found in the waste sulphite liquor, largely in combination with part of the dissolved wood substance. These chemicals are ordinarily lost with the waste liquor, but may be partially recovered by suitable handling of the liquor before or during the process for recovering concentrated waste sulphite liquor by evaporation, thus presenting still further potential economies in the pulping process, if the evaporation problem can be solved.

It is a major object of the method of our invention to provide a novel and efficient process for the evaporative recovery from waste sulphite liquor of a valuable product which may be burned as fuel or otherwise used, said process being free from the difficulties with scale formation inherent in the usual evaporative methods of concentration when applied to waste sulphite liquor.

It is a further object of our method to recover the vaporizable sulphur dioxide content of sulphite waste liquor for reuse in the pulp cooking process.

A still further object of our method is the provision of a process for recovering valuable products from dilute waste sulphite liquor by evaporative concentration, whereby the vapors generated in the evaporation may be recovered for, and are of a nature suitable for use in the pulp cooking process or elsewhere.

We have noted in the foregoing that the major obstacle to the economical recovery of a combustible product from waste sulphite liquor by evaporative concentration has heretofore been the difficulties resulting from the deposition of scale upon the heat transfer surfaces of the usual evaporators. This obstacle is entirely avoided when the evaporation is done according to the method of our invention. We have discovered that the heat required for concentration may practicably be supplied to the waste liquor by passing an electrical current through the liquor, the liquor itself being the current conductor and converting the electrical power into heat by virtue of its resistance to the passage of the current. Difficulties with scaling cannot arise when waste sulphite liquor concentration is done according to the method of our invention since, by our method, the heat required for evaporation is generated in the body of the solution and any precipitate which may develop must be in the form of small suspended particles dispersed throughout the solution. Furthermore, since the heat is generated in the solution and does not pass from the containing surfaces to the solution, but rather from the solution to the surfaces, these surfaces are always cooler than the solution in contact with them, and accordingly they neither cause precipitation of solids from the adjacent liquor, nor attract and hold solids precipitated elsewhere. The use of electricity as a heat source might, on first consideration, appear to be prohibitively expensive but, in proper combination with the other elements of our invention, this electrical heating not only makes waste sulphite liquor evaporation practicable, but does so with an energy and cost economy not heretofore possible by other means. These further elements of our invention and their proper relationship to the element of electrical heating will be described hereinafter.

The principal features of the method of our invention for concentrating waste sulphite liquor with recovery of sulphur dioxide may be briefly stated as comprising continuously passing waste sulphite liquor from a reservoir containing a body of waste sulphite liquor maintained at substantially the desired maximum concentration to spaced electrodes between which is maintained a difference in electrical potential whereby an electrical current is caused to flow through the waste sulphite liquor passing between and in contact with said electrodes thereby generating in the waste sulphite liquor the heat required for evaporative concentration, continuously separating water vapor and gaseous sulphur dioxide from the electrically heated waste sulphite liquor, continuously returning to the waste sulphite liquor contained in said reservoir the waste sulphite liquor residual to the separation of water vapor and sulphur dioxide, continuously removing the separated water vapor and gaseous sulphur dioxide, continuously removing concentrated waste sulphite liquor and continuously adding dilute waste sulphite liquor in a manner effective to maintain the concentration of said body substantially constant.

We use the phase "reservoir containing waste sulphite liquor maintained at substantially the desired maximum concentration" in this disclosure and the appended claims, to indicate that as part of evaporative cycles operating according to the method of our invention, there is a body or mass of liquor which has been brought to and is maintained at approximately the concentration which is desired in the concentrated waste sulphite liquor product. It will be understood that the concentration desired in the product, and hence the concentration at which this body is maintained, may vary from one application of our method to another without departing from the above interpretation of the phrase.

The actual conditions employed in the concentration of dilute waste liquor by the method of our invention may vary greatly from one application of the method to another. Thus in one embodiment of the invention the portion of the circulating liquor stream being heated by the passage of the electrical current is kept under such pressure as will prevent boiling in the intra-electrode space, concentration being effected by passing the heated liquor stream into a flash chamber in which the pressure is less than the vapor pressure of the entering liquor. In this chamber vapor is formed by flashing and is there separated from the residual liquor.

In another application of the method of our invention, substantially all of the concentration is effected in the intra-electrode space; that is, heating and evaporation are done simultaneously in that portion of the circulating liquor stream which is between the opposed electrodes. In this case the pressure on the waste liquor in the intra-electrode space is kept substantially equal to the pressure at which the liquor and vapor are separated.

Our method of concentrating waste sulphite liquor may also be applied using conditions intermediate between those described above, thus distributing the generation of the vapor between the intra-electrode space and a flash chamber in such proportions as may be desirable in a given application.

It is a valuable feature of the method of our invention that the sulphur dioxide-bearing vapors generated in the evaporative concentration can be readily produced at a sufficiently high pressure to permit their use in cooking sulphite pulp by the direct steaming method. We may in this way effect a complete recovery of the heat and chemical values of these vapors in a direct and simple manner.

In some applications of the method of our invention we find it desirable to preheat the dilute liquor feed to the evaporative cycle by indirect heat exchange with part of the vapors produced in the evaporative cycle; this modification of our method produces an increased efficiency of operation under certain conditions.

Because of the electrical conductivity and other properties of waste sulphite liquor, the application of the method of our invention requires the use of types of apparatus not heretofore known; furthermore our method may be practised with apparatus operating under a fairly wide range of conditions. For these reasons it will be necessary to go into some detail with reference to suitable apparatus for practising our invention, and to possible modes of operation, in order that the method and its scope may be fully understood, and its practice rendered clear. We therefore set down here for guidance various aspects of the invention and its application in the order in which they shall be dealt with hereinafter. We shall give:

Firstly, a description of a typical plant embodying the method of our invention and of the mode of operation of such a plant;

Secondly, some of the factors involved in the design of an electrical conductance heater for waste sulphite liquor suitable for use in a plant of the type described, together with data on the electrical conductivity of waste sulphite liquor, and the influence of this conductivity on the design of a suitable heater;

Thirdly, a detailed description of an electrical conductance heater suitable for use in the practice of the method of our invention, together with possible modifications in this heater to permit use of various conditions in the evaporative cycle;

Fourthly, some typical operating conditions for the plant layout and heater described;

Fifthly, some general considerations in connection with the method and its application relating to the nature and use of the vapor, feed liquor preheating, and the importance and relationships of the various elements comprising the method of our invention;

And finally, the economic aspects of the method.

In the accompanying drawings:

Fig. 2 is a chart showing the variation of specific conductance of waste sulphite liquor with concentration at various temperatures.

Fig. 3 is a plan view of a three phase electrical conductivity heater suitable for use in the plant layout of Fig. 1.

Fig. 4 is a partly sectioned elevational view of the heater of Fig. 3 showing a single heating chamber and the header assembly, the other heating chambers, which are identical with that illustrated, having been omitted for clarity of illustration.

Figure 1:
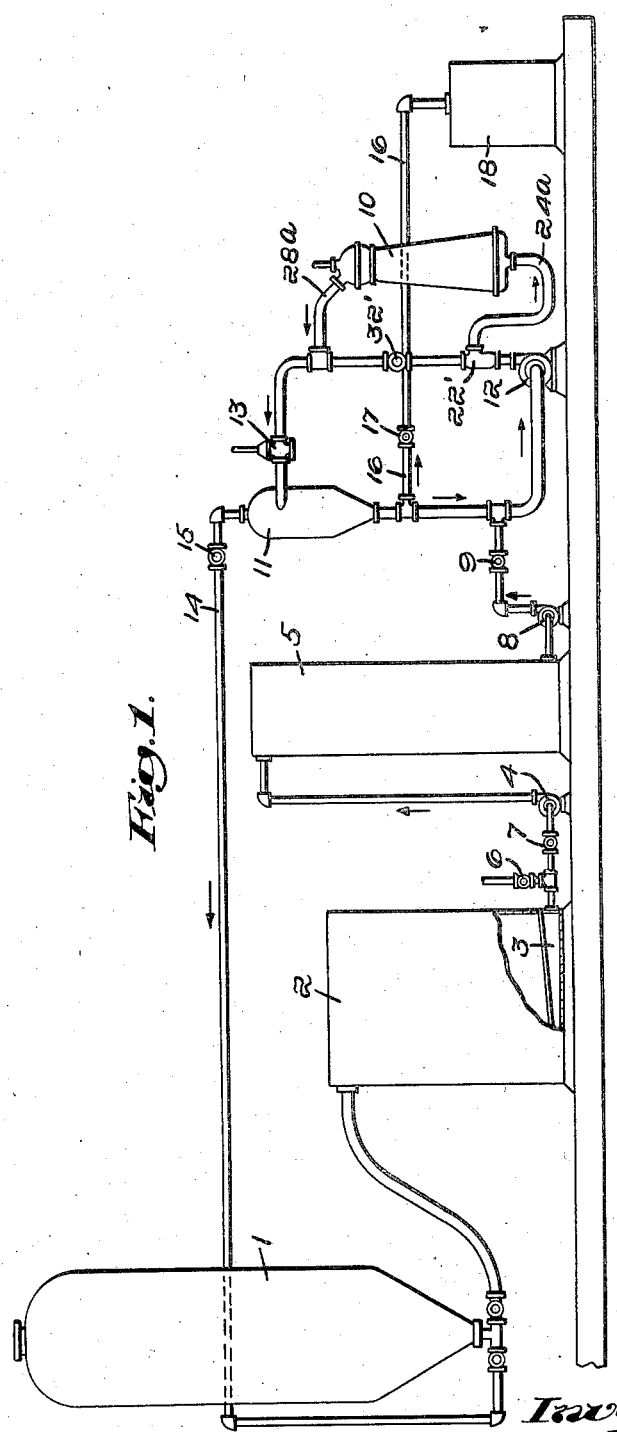
Fig. 1 shows diagrammatically a typical plant layout for the practice of our method.

A typical plant layout is described with reference to Figure 1, numbers in this text referring to the like numbered parts of Figure 1. We show at 1 the pulp digester and at 2 the blowpit commonly used in sulphite pulp production. The blowpit, among other functions serves to effect separation of the spent cooking liquor from the pulp by drainage and washing, being provided with a perforated drainage floor which retains the pulp while allowing the waste liquor and wash water to pass into the space 3 under the drainage floor. From this space 3 we transfer the hot, dilute waste sulphite liquor by means of the pump 4 into the hot liquor storage vessel 5, which is preferably insulated to retain the heat content of the waste sulphite liquor.

We provide valves 6 and 7 so that excess or overly dilute waste liquor may be diverted to a sewer. From storage vessel 5 we pump the hot dilute waste liquor by means of the feed pump 8 through control valve 9 into an evaporator which comprises in the present instance, two main units; a suitable electrical conductance heater 10, and a flash chamber 11, which are described in more detail later. A pump 12 draws liquor, which is at substantially the maximum concentration desired for the evaporator product, from the body of waste sulphite liquor in the bottom of flash chamber 11 and forces it into the heater 10, where heating of the liquor is effected by the passage of an electrical current through the liquor between electrodes spaced within the heater. The liquor leaving the heater 10 reenters the flash chamber 11 near its upper end after passing through a pressure regulating device 13 adapted to maintain a higher pressure on the upstream side than on the downstream side of itself. By means of the pump 12 we effect circulation of the liquor between the heater and flash chamber as noted, and also maintain a hydrostatic pressure in the heater in excess of the vapor pressure of the liquor leaving the heater. We maintain the pressure in the flash chamber below the vapor pressure of the liquor entering the pressure regulating device 13, thus causing a flash generation of steam in the liquor stream entering the chamber 11 due to the momentarily superheated condition of the liquor after passing the pressure regulating device. The steam so generated, which contains sulphur dioxide freed from solution and from chemical combination by the heating and flashing, is passed by the pipe 14 and the valve 15 into the digester 1 where it supplies part or all of the steam and some of the sulphur dioxide required for cooking pulp. The liquor circulating in the heater-flash chamber circuit is maintained at substantially the desired maximum concentration. Part of it is continuously withdrawn through the pipe 16 and the valve 17 to the concentrated liquor storage tank 18. We withdraw the product in such proportion to the rate of steam generation, and to the rate of addition of the dilute waste sulphite liquor feed, that the quantity of liquor in the evaporator, and its concentration remain substantially constant.

Due to the nature of the process and the material handled, it was necessary to design a novel type of electrical conductance heater to permit practice of the method of our invention. The design of a heater satisfactory for the purpose involves obtaining a balance among a number of factors of which electrical conductivity of the waste sulphite liquor, voltage to be used, provision to separate vapors and to minimize foaming, and provision of adequate electrode areas may be mentioned. Of these, the factor of primary interest is the conductivity of the waste sulphite liquor.

We have discovered the electrical conductance of waste sulphite liquor as obtained by blowpit drainage and the conductance of the same liquor after various degrees of concentration by evaporation, to be as shown in Figure 2 wherein each curve represents the variation in electrical conductance at the noted temperature over a range of liquor concentrations. These curves may be considered representative, as to general form, of the electrical conductivity relationships of normal calcium-base waste sulphite liquor, although the values for a specific liquor may depart slightly from the data given in the curves of Figure 2. The preferred conditions for concentrating waste sulphite liquor by our method involves the production of a concentrate of about 50% solids content using such conditions that the liquor is electrically heated through or within a temperature range such as from 360° F. to 420° F. Under these conditions the electrical conductance of the liquor, as obtained from Figure 2, is about 0.037 reciprocal ohms per cubic centimeter. Comparable tests on the conductance of typical samples of water from large commercial electrical water boilers showed them to have specific conductances of about 0.0010 reciprocal ohms per cubic centimeter.

The amount of current which will pass through a conducting fluid lying between and in contact with a pair of electrodes will vary with the electrical potential between the electrodes, the specific conductance of the fluid, the cross sectional area of the mass of fluid between the electrodes, and inversely with the distance between the electrodes. Expressed in the form of an equation the relationships are:

$$I = \frac{kEA}{L}$$

Where:
I = current, in amperes
k = specific conductance of fluid, reciprocal ohms per cu. cm.
E = potential difference between electrodes in volts
A = cross sectional area of fluid between electrodes, sq. cms.
L = distance between electrodes, cms.

The power input in watts is given by:

$$\frac{kE^2A}{L}$$

Since, as has been mentioned, the specific conductance of waste sulphite liquor is some thirty-seven times that of the water in commercial electric water boilers, it will be apparent that such boilers could not practicably be used for evaporating waste liquor without making major changes in their design, as by reducing the operating voltage or the current path cross sectional area, or by increasing the length of the current path between the electrodes. Actually, however, the form of known types of large steam capacity, electric water boilers makes it impossible to adapt them for use in heating waste sulphite liquor electrically, since their proportions cannot be changed through a wide enough range to compensate for the disparity in the electrical conductivities of water and of waste sulphite liquor. Nor can the known electric water boilers be accommodated to waste sulphite liquor by a combination of dimensional changes with a reduction in operating voltage, since various design factors in connection with electrical conductance heaters for waste sulphite liquor make it necessary to use voltages of the same high range as are employed in these electric water boilers. Other known types of electrical conductance heaters are also unsuitable for use in our method of processing waste sulphite liquor for a variety of reasons, but principally because they are of relatively low power capacity and not adaptable to the required increase in size. Successful commercial scale application of the method of our invention therefore required the invention of new types of electrical conductance heaters, one such type being described in detail below.

In the application of our method of concentrating waste sulphite liquor described in connection with Figure 1, we indicated the electrical heater as being a single vessel and it may have that form where single phase power is used; ordinarily, though, three phase power is to be preferred. A suitable three phase electrical conductivity heater is shown diagrammatically in Figures 3 and 4.

In Figure 3 we show a plan view of a three phase electrical conductivity heater, suitable for use in a plant layout such as is indicated in Figure 1, in which 19, 19' and 19'' are three heating chambers and 20 is a common central header assembly comprising parts 22, 31, 32, 29, and 30 of Figure 4. Figure 4 is a partly sectioned elevational view of the heater of Figure 3 showing a single heating chamber 19 and the header assembly 20, the other heating chambers, which are identical with 19, having been omitted for clarity in the illustration. Liquor from the pump 12 enters the heater by pipe 21, passing into the pipe fitting 22 which has a non-conducting ceramic lining 23. From the fitting 22, the liquor passes by the ceramic lined pipe 24 into the ceramic lined heating chamber 19 and by corresponding pipes, not shown, one of which is indicated at 24'' in Figure 4, into the heating chambers 19' and 19''. The liquor flows upward from the bottom of chamber 19 through a lower electrode space 25, up the annular passage or intra-electrode space 26 into the upper electrode space 27, leaving the heating chamber by the pipe 28 connecting to the fitting 29 in which the liquor streams from the chambers 19, 19' and 19'' are recombined by way of pipes 28' and 28'' (Figure 3), the total flow passing to the pressure regulating means 13 by the pipe 30. The pipes 31 and the valve 32 constitute a liquor bypass by which the flow through the heating chambers may be controllably short-circuited for a purpose described below. Heating is effected in the heating chambers by the passage of an electrical current through the liquor between the electrode 33 in the electrode space 25 and the electrode 34 in the upper electrode space 27. A conductor 35, passing through the heating chamber wall in an insulating bushing 36 and connecting to the electrode 33 is connected at its outer end to one wire of a three wire, three phase, electric power source. The upper electrode 34 is supported from and electrically connected to the top of the electrode space 27 by the rods 37. A ceramic covered plug 38 is mounted coaxially of the chamber 19 by the ceramic covered shaft 39 which leaves the heating chamber by the stuffing box 40. That end of the shaft 39 projecting beyond the heating chamber is connected to a suitable power source, not shown, capable of positional control whereby the shaft and plug may be positioned axially as desired. The power source controlling the axial position of the plug 38 is actuated and controlled by the steam demand made upon the evaporator, in such a way as to constrict or widen the tapered annular passage 26, and thus change the electrical resistance of and power input to the mass of liquor between the electrode 33 and the electrode 34 to maintain the desired balance between steam production and steam demand. When the passage 26 is so constricted, the hydraulic resistance to the flow of liquor along this passage increases and may cause a large hydraulic thrust on the plug 38 which thrust would be imposed on the positional control mechanism. To minimize this hydraulic thrust for easier operation of the control mechanism, a liquor bypass comprising the pipes 31 and the automatically controlled valve 32 is provided. The valve 32 is so controlled that the liquor flow through the heating chambers 19, 19' and 19'' is maintained approximately proportional to the rate of electrical power input, the valve 32 being completely closed and all the liquor passing through the heating chambers when the maximum electric current flows, and a proper proportion flowing through the bypass 31—32 at other current flow rates. The ceramic, electrically insulating lining 23 extends in unbroken continuity from section 41—41 downwards to the flanges connecting fitting 22 to pipes 21 and 31. Electrical current passes through the conductor 35 to the electrode 33 whence most of it passes through the liquor to the electrode 34. From the electrode 34 the current passes by the conducting electrode supports 37 into the uninsulated metallic head 42 of the heating chamber and from there, through the metallic walls of the pipe 28 and the chamber 19 and pipe 24 into the header assembly 20. In the header assembly the three out-of-phase currents from the three heating chambers 19, 19' and 19'' largely or entirely neutralize one another. If the three currents are not equal in the three heating chambers, the unbalanced current is conducted to earth by the ground 43 which keeps all external metallic parts (conductor 34 excepted) at earth potential. A minor portion of the current leaving electrode 33 passes through the liquor in pipe 24 and is largely or entirely neutralized in the fitting 22 by the corresponding currents from 19' and 19'', the length and diameter of pipe 24 being so proportioned to the dimensions of the liquor space between the electrodes 33 and 34 as to give the desired distribution of the current from electrode 34 between the alternative paths. A very small electrode 44 serves to collect any small unbalanced current which may occur in fitting 22 and carry it by the conducting supports 45 to the grounded exterior of the fitting. The plug 38 and the supporting shaft 39 have a complete and continuous insulating coating from the lower end of shaft 39 to a point on the upper portion of shaft 39 which is always above the electrode 34. The grounded head 42 and the electrode 34 create a space between themselves in which the liquor has substantially zero electrical potential with respect to the outside of chamber 19 and earth, permitting the shaft 39 to project through the stuffing box 40 without danger of current leakage there.

A flash chamber suitable for use in connection with the heater just described may be a vertically mounted, cylindrical pressure vessel having a domed top and a conical bottom. Liquor from the pressure regulating device 13 enters the flash chamber tangentially near its upper end at high speed, and spirals down the wall of the chamber into the conical bottom. The centrifugal effect of the high-speed, spiral course of the liquor causes complete and ready separation of the steam from the liquor and breaks down any foam which may form. The steam is removed from a central opening in the dome through a pipe which projects axially into the chamber and has its lower end below the liquor inlet level. The conical bottom of the flash chamber holds a reservoir of concentrated liquor from which the circulating pump 12 draws the liquor which is forced through the heater. The concentrated product is withdrawn from the body of liquor in the conical bottom through the valve 17 which is automatically controlled to pass liquor only when it is at substantially the desired maximum concentration. The control of valve 17 may be based on the density or the electrical conductivity of the liquor, both of these properties, when properly compensated for temperature variations, varying with concentration and being readily measured by known instruments capable of giving the desired control of valve 17. The correct rate of dilute liquor feed to the evaportor may be obtained automatically by controlling valve 9 by an instrument of known type adapted to maintain a substantially constant liquor level in the conical portion of the flash chamber 11.

The conductance heater described in detail above is designed and proportioned to operate in such a way that the waste liquor flowing through it is merely heated, no vapor formation occurring in the heater. However, this heater may be modified to operate with generation of part or all of the vapor in the intra-electrode space by increasing the cross-sectional area of the liquor passage 26 to compensate for the increased electrical resistance of the liquid-vapor mixture as compared to the resistance of the liquor alone. At the same time the rate of circulation of liquor through the heater may be reduced, the pressure regulating means adjusted to maintain a reduced back-pressure on the heater, or both changes made together to control the proportions of vapor produced in the heater 10 and the flash chamber 11.

The application of our invention is not limited to the types of apparatus described, and other suitable apparatus and arrangements may be employed. Thus, if substantially all the vapor generated is produced in that portion of the liquor stream which is in passage between the opposed electrodes, it is possible to obtain the functions of the heater 10 and the flash chamber 11 in a single vessel. Such a vessel will contain the reservoir from which the concentrated liquor is passed to the intra-electrode space, the space electrodes, provision for forming a current path between the electrodes by means of a flowing stream of waste sulphite liquor and vapor, means of separating the liquor and vapor, and provision for the return of the separated waste sulphite liquor to the reservoir.

We have noted in the foregoing that the method of our invention may be practised with various combinations of conditions in different applications, but, in order that the practice of our invention might be more readily understood, we will give as an example one combination of working conditions for a plant of the type described with reference to Figure 1 in which the electrical conductance heater is that described in connection with Figures 3 and 4. As the operations of collection and supply of dilute feed liquor and the removal of concentrated product are obvious, only the conditions in the circulation cycle of the evaporator need be considered. We find that, when the steam and sulphur dioxide mixture produced by the evaporator is to be used for the direct cooking of pulp, the vapor pressure in the flash chamber 11 may suitably be maintained at about 150 pounds per square inch and that the pump 12 should apply, and the pressure regulating means 13 maintain, a pressure within the heater 10 of about 250 pounds per square inch. The rate of circulation of the concentrated liquor through the heater should be so proportioned to the rate of addition of heat that the vapor pressure of the liquor leaving the heater is more than 150 pounds and less than 250 pounds per square inch, a value of 225 pounds per square inch being suitable. Under these conditions the amount of vapor produced in the flash chamber will be about 3 pounds per 100 pounds of heated liquor entering. The proportion of liquid evaporated per cycle is limited by economic considerations of power cost for the circulating pump 12 and cost of heavier construction attendant on the use of increased pressure differentials between the flash chamber and the heater, but this proportion may be made as high as 6% by operating the flash chamber at a lower pressure, such as 40 pounds per square inch, if the energy content of the steam at that pressure can be fully utilized.

When the method of our invention is employed with a heater modified to operate with generation of part of the vapor in the intra-electrode space, the pressure regulating means 13 is adjusted to maintain a back-pressure on the heater sufficient to allow the liquor to absorb in the form of sensible heat only part of the heat evolved, the balance of the heat causing boiling of the liquor during its passage between the electrodes while the absorbed sensible heat generates a further amount of vapor in the liquor as it passes into the flash chamber. By suitable balancing of the rate of liquor circulation, rate of heat input, and pressure differential between the heater and flash chamber the proportion of heat picked up as sensible heat, and hence the distribution of the total evaporation between the flash chamber and the heater, may be controlled as desired.

We have noted that the heat for evaporation is added to the liquor by the passage of a current through the liquor between spaced electrodes and that the liquor being so heated is circulated to and from the intra-electrode space. It is one of the essential characteristics of the method of our invention that this circulation be carried out at a rate considerably in excess of the rate of evaporation: firstly, in those cases where the method is so applied as to prevent boiling in the intra-electrode space, because the sensible heat capacity of the liquor is limited by the need to maintain practicable combinations of vapor pressure in the flash chamber and hydraulic pressure in the heater; and secondly, in these cases where boiling is permitted to occur in the heater, because the volume of vapor relative to the volume of liquor in the intra-electrode space is limited by the requirement that sufficient liquor be present to provide adequate current conductivity in the small volume of the conducting path between the electrodes. The volume of this conducting path will be relatively small due to the electrical conductivity characteristics of waste sulphite liquor and to equipment design factors. Because of the sensible heat factor, the vapor volume factor or both in combination, we have found it essential in the application of our method to limit the amount of water vapor produced per pound of liquor passing through the intra-electrode space. The maximum permissible ratios of evaporation to circulation which may be used will obviously be a function of the design of the equipment used to carry out the method of our invention; in general, though, the mass rate of circulation of liquor to, through and from the intra-electrode space will be at least four-fold the mass rate of evaporation. This limitation on the ratio of the rate of evaporation relative to the rate of circulation is most readily expressed with reference to the amount of heat added per pound of liquor circulated to the electrical conductance heater. A four-fold rate of circulation relative to the rate of evaporation is equivalent to the addition of about 200 British thermal units per pound of liquor heated and this represents about the practical upper limit in regard to this factor. We may, however, use any lower value of this factor, as for instance in the example previously given where the evaporation was at the rate of about 3% of the rate at which liquor was passing through the heater. In this case about 28 British thermal units were being added per pound of liquor heated.

The concentration of dilute waste sulphite liquor according to the method of our invention produces, in addition to the desired concentrated liquor solution, a steam or vapor mixture containing water vapor and gaseous sulphur dioxide which is valuable both for its heat content, approximately equivalent to the electrical energy added in the evaporator, and for its content of sulphur dioxide. Since this vapor may by our method readily be produced at high pressure, its heat and chemical content are most conveniently, directly and economically recovered by using the vapor for cooking sulphite pulp by the direct steaming method, although our method is not limited to this particular use.

The vapor may be used for cooking sulphite pulp by the indirect steaming method in which condensation of the vapor heats the cooking acid by indirect heat transfer. The heat content of the evaporator vapor is largely recovered in this way and the sulphur dioxide, most of which stays in the gaseous phase when the water vapor condenses, may be recovered from the heat exchanger and returned to the cooking acid in several ways, as by return to the towers in which cooking acid is made, or by passing it into a hot acid accumulator. When the vapor from the evaporation of waste sulphite liquor is used for cooking pulp by indirect heat exchange, there may be heat loss, as compared with the use of such vapor for the direct cooking of pulp, due to inability to completely utilize the heat content of the condensate from the heat exchanger, but the economics of our recovery method are not thereby adversely affected; this loss being approximately compensated by the fact that indirect steaming usually produces waste sulphite liquor of a higher concentration which gives a higher yield of combustible product per unit of energy supplied for evaporation.

In some applications of our method the energy content of the sulphur dioxide bearing vapor may be converted into a form of broader usefulness by passing these vapors from the evaporator into a steam converter of the indirect heat exchange type in which condensation of the mixed vapors produces a secondary steam from water by indirect heat exchange. This secondary steam which can be produced at relatively high pressures, is free of sulphur dioxide and may therefore be used in steam engines, paper machine driers, or elsewhere. During condensation of the evaporator vapor in the steam converter, gaseous sulphur dioxide accumulates in the condensation space from which it can be removed at high concentration for reuse in the digesters or elsewhere. In another arrangement, the acid steam may be freed from its sulphur dioxide content by passing it through a high pressure absorption tower in which caustic soda or lime solutions effect removal of the sulphur dioxide. The stripped vapors may then be used where desired without the limitations which might otherwise be imposed by the presence of corrosive sulphur dioxide. The sulphur dioxide so removed from the vapor is readily recovered by sending the spent absorption tower liquor to the acid making system.

In applying the method of our invention we prefer to produce the water vapor-sulphur dioxide mixture at a pressure of about 150 pounds per square inch, this pressure being adequate to permit use of the vapors for cooking pulp by direct steaming. Furthermore, the relatively high pressure minimizes the foaming tendencies of the waste liquor by reducing the specific volume of the vapors, while the high temperature aids by reducing the liquor viscosity. Vapor pressures higher or lower than 150 pounds per square inch may be readily obtained by our method if desired. Since economic factors in the application of our invention require that the vapors produced have sufficient pressure to permit the economical recovery of most of their energy content in such steam-using outlets as are available in associated processes, the lower limit of pressure for these vapors will therefore be governed by the nature of the outlets available for their use.

We have noted that it may be desirable in some applications of the method of our invention to preheat the dilute liquor feed to the evaporator cycle by indirect heat exchange using for this purpose part of the steam produced in the evaporation of the liquor. This modification of the method is of particular value when excess dilute waste sulphite liquor is available and the steam production capacity of the evaporator system exceeds the demand for sulphur-dioxide bearing steam. Under such conditions part of the steam produced may be advantageously used to preheat the dilute liquor feed. This will require an increase in the total amount of steam produced for a given consumption of steam for pulp cooking or other use, and will result in an increase in output of the valuable concentrated product. Since the heat required to raise the feed liquor temperature to the evaporator boiling temperature originates in the heater whether a preheater is used or not, it is obviously immaterial whether the feed liquor receives this heat directly in the heater or externally through the intermediary of steam which derived its heat content from the heater. In fact, where it is possible to completely utilize the latent heat contents of the preheater condensate and of the concentrated product, the preheater gives an extra evaporative effect equivalent to the amount of steam used for preheating without increase in the evaporator power input. In a typical example, even without utilizing the latent heats of the preheater condensate and of the concentrated liquor, the use of a preheater increased the amount of concentrated liquor produced by 35% for an increase in power input of only 10% over the condition where no preheater was being used, the steam production for pulp cooking being the same in both cases.

It is a feature of the method of our invention in which a preheater is used that the overall efficiency, defined as the sum of the energy in the usable steam produced plus the energy available on burning the concentrated product, relative to the power input, is increased as the temperature of the dilute feed stock is reduced. We may, therefore, interpose between the liquor storage tank 5 and the evaporator preheater a vacuum chamber into which the hot waste liquor from the storage tank may be flashed. This step cools and partially concentrates the feed liquor and removes part of its sulphur dioxide content. The water vapor produced in this vacuum chamber is condensed, the sulphur dioxide removed and compressed for return to the pulp cooking process by way of the acid towers, hot acid accumulators or digesters, and the cooled and partly concentrated liquor passed on to the evaporator preheater. The dilute waste sulphite liquor may also in some instances be given a preliminary treatment, as with lime, to neutralize it before evaporation.

It will be apparent from the foregoing that the use of electricity, by passing a current through waste sulphite liquor to provide the heat required for evaporation according to our method, has results which extend far beyond the mere substitution of a new heating means for the heat sources ordinarily used in large scale evaporators. Electrical conductance heating by the method of our invention eliminates the heat transfer surfaces and the problem of scale deposition thereon which has heretofore been the major obstacle to the economical recovery of a valuable concentrated product from dilute waste sulphite liquor. Furthermore, with electrical conductance heating, the generation of heat in the liquor is not subjected to limitations imposed by the temperature of the liquor, as is the case with indirect heat transfer using heat supplied by the condensation of steam, and evaporation may therefore readily be performed at as high a temperature and pressure as may be desirable.

Energy economy in evaporation is most commonly obtained by the use of multiple effect evaporators in which steam supplied to a first effect produces about an equal weight of vapor which performs further evaporation when condensed in a second effect, and so on. As there is no practical, low cost method of repeatedly reconverting a large proportion of the energy in evaporator vapors into electrical energy for reuse in a cycle analogous to multiple effect evaporation, low cost concentration of waste sulphite liquor by the method of our invention requires that the vapors produced have a value comparable to that of the electrical power used to produce them. This requirement is met in our method by using a relatively high pressure in the evaporator, thus permitting use of the steam in various valuable ways, simplest and best of which is its use for cooking sulphite pulp by the direct steaming method. It will be seen, therefore, that in our method the elements of electrical conductance heating and performance of the evaporation at a relatively high pressure complement one another to form a combination in which the value of each element is augmented by the presence of the other to give, in association with the other elements of the method of our invention, a new and valuable method for the recovery of concentrated waste liquor and sulphur dioxide.

The breadth of the field of application of our method will depend in some measure upon the cost of electrical power relative to that of coal or other fuels. Our method is of particular value in such areas as the Niagara Falls, northwestern States and northern Quebec regions where low cost excess electrical power is available. In these areas a number of sulphite pulp mills generate their steam for cooking pulp by means of electric water boilers. The amount of power required to produce a pound of steam in these boilers slightly exceeds that needed to produce a pound of steam from waste sulphite liquor by the method of our invention. It is therefore apparent that, by applying to the evaporation of waste sulphite liquor by the method of our invention part or all of the power currently used to produce steam in electric water boilers, the power cost debit for the evaporation of waste sulphite liquor will be fully offset by an equal credit for the steam supplied by the evaporator for the cooking of pulp or for other use. Thus the concentration of valueless, dilute waste sulphite liquor into a valuable product is effected without charge to the process for energy, and in addition valuable sulphur dioxide is recovered from the waste sulphite liquor and returned in the steam directly to the cooking process.

A co-pending application S. N. 657,220, filed March 26, 1946, now abandoned, and claiming the concentration of the waste sulfite liquor without recovery of sulphur dioxide is hereby referred to.

Having described the process for which we desire the protection of Letters Patent, we claim:

1. The method of concentrating waste sulphite liquor with recovery of sulphur dioxide which comprises continuously withdrawing waste sulphite liquor from a reservoir containing waste sulphite liquor maintained at substantially the desired maximum concentration and continuously forcing the withdrawn waste sulphite liquor to flow to spaced electrodes between which is maintained a difference in electrical potential whereby an electric current is caused to pass through the waste sulphite liquor flowing between and in contact with said electrodes thereby generating in the waste sulphite liquor the heat required for evaporative concentration, said heat being generated at a rate of less than 200 British thermal units per pound of liquor flowing between said electrodes, continuing the flow of the heated waste sulphite liquor from said electrodes and continuously separating from it the water vapor and gaseous sulphur dioxide formed by the electrically generated heat, then completing the circulation cycle by continuously returning the waste sulphite liquor remaining after the separation of water vapor and gaseous sulphur dioxide to the waste sulphite liquor contained in said reservoir, continuously bleeding off concentrated waste sulphite liquor from the circulation cycle and continuously adding dilute waste sulphite liquor to the circulation cycle and continuously withdrawing the separated water vapor and gaseous sulphur dioxide all in a manner effective to maintain the concentration of the waste sulphite liquor contained in said reservoir at substantially the desired maximum concentration.

2. The method of concentrating waste sulphite liquor with recovery of sulphur dioxide which comprises continuously withdrawing waste sulphite liquor from a reservoir containing waste sulphite liquor maintained at substantially the desired maximum concentration and continuously forcing the withdrawn waste sulphite liquor to flow to spaced electrodes between which is maintained a difference in electrical potential whereby an electric current is caused to pass through the waste sulphite liquor flowing between and in contact with said electrodes thereby generating in the waste sulphite liquor the heat required for evaporative concentration, said heat being generated at a rate of less than 200 British thermal units per pound of waste sulphite liquor flowing between said electrodes, maintaining on the waste sulphite liquor flowing between and in contact with said electrodes a pressure such that boiling of the waste sulphite liquor occurs between said electrodes, continuing the flow of the heated waste sulphite liquor from said electrodes and continuously separating from it the water vapor and gaseous sulphur dioxide formed by the electrically generated heat, then completing the circulation cycle by continuously returning the waste sulphite liquor remaining after the separation of water vapor and gaseous sulphur dioxide to the waste sulphite liquor contained in said reservoir, continuously bleeding off concentrated waste sulphite liquor from the circulation cycle and continuously adding dilute waste sulphite liquor to the circulation cycle and continuously withdrawing the separated water vapor and gaseous sulphur dioxide all in a manner effective to maintain the concentration of the waste sulphite liquor contained in said reservoir at substantially the desired maximum concentration.

3. The method of concentrating waste sulphite liquor with recovery of sulphur dioxide which comprises continuously withdrawing waste sulphite liquor from a reservoir containing waste sulphite liquor maintained at substantially the desired maximum concentration and continuously forcing the withdrawn waste sulphite liquor to flow to spaced electrodes between which is maintained a difference in electrical potential whereby an electric current is caused to pass through the waste sulphite liquor flowing between and in contact with said electrodes thereby generating in the waste sulphite liquor the heat required for evaporative concentration, said heat being generated at a rate of less than 200 British thermal units per pound of liquor flowing between said electrodes, maintaining on the waste sulphite liquor flowing between and in contact with said electrodes a pressure in excess of the maximum vapor pressure of the liquor between said electrodes, continuing the flow of the heated waste sulphite liquor from said electrodes through a pressure regulating means, maintaining on the waste sulphite liquor leaving said pressure regulating means a vapor pressure less than the vapor pressure of the waste sulphite liquor entering said pressure regulating means to cause flash formation of water vapor and gaseous sulphur dioxide from the electrically heated waste sulphite liquor, continuing the flow of the heated waste sulphite liquor from said pressure regulating means and continuously separating from it the water vapor and gaseous sulphur dioxide formed by the electrically generated heat, then completing the circulation cycle by continuously returning the waste sulphite liquor remaining after the separation of water vapor and gaseous sulphur dioxide to the waste sulphite liquor contained in said reservoir, continuously bleeding off concentrated waste sulphite liquor from the circulation cycle and continuously adding dilute waste sulphite liquor to the circulation cycle and continuously withdrawing the separated water vapor and gaseous sulphur dioxide all in a manner effective to maintain the concentration of the waste sulphite liquor contained in said reservoir at substantially the desired maximum concentration.

4. The method of concentrating waste sulphite liquor with recovery of sulphur dioxide which comprises continuously withdrawing waste sulphite liquor from a reservoir containing waste sulphite liquor maintained at substantially the desired maximum concentration and continuously forcing the withdrawn waste sulphite liquor to flow to spaced electrodes between which is maintained a difference in electrical potential whereby an electric current is caused to pass through the waste sulphite liquor flowing between and in contact with said electrodes thereby generating in the waste sulphite liquor the heat required for evaporative concentration, said heat being generated at a rate of less than 200 British thermal units per pound of liquor flowing between said electrodes, continuing the flow of the heated waste sulphite liquor from said spaced electrodes to a vapor separating means effective to separate from the heated waste sulphite liquor the water vapor and gaseous sulphur dioxide formed by the electrically generated heat, and completing the circulation cycle by continuously returning the waste sulphite liquor remaining after the separation of water vapor and gaseous sulphur dioxide to the waste sulphite liquor contained in said reservoir, continuously bleeding off concentrated waste sulphite liquor from the circulation cycle and continuously adding dilute waste sulphite liquor to the circulation cycle and continuously withdrawing the separated water vapor and gaseous sulphur dioxide all in a manner effective to maintain the concentration of the waste sulphite liquor contained in said reservoir at substantially the desired maximum concentration.

5. The method of concentrating waste sulphite liquor with recovery of sulphur dioxide which comprises continuously withdrawing waste sulphite liquor from a reservoir containing waste sulphite liquor maintained at substantially the desired maximum concentration and continuously forcing the withdrawn waste sulphite liquor to flow to spaced electrodes between which is maintained a difference in electrical potential whereby an electric current is caused to pass through the waste sulphite liquor flowing between and in contact with said electrodes thereby generating in the waste sulphite liquor the heat required for evaporative concentration, said heat being generated at a rate of less than 200 British thermal units per pound of waste sulphite liquor flowing between said electrodes, maintaining on the waste sulphite liquor flowing between and in contact with said electrodes a pressure such that boiling occurs in the waste sulphite liquor between and in contact with said electrodes, continuing the flow of the heated waste sulphite liquor from said spaced electrodes to a vapor separating means effective to separate from the heated waste sulphite liquor the water vapor and gaseous sulphur dioxide formed by the electrically generated heat, and completing the circulation cycle by continuously returning the waste sulphite liquor remaining after the separation of water vapor and gaseous sulphur dioxide to the waste sulphite liquor contained in said reservoir, continuously bleeding off concentrated waste sulphite liquor from the circulation cycle and continuously adding dilute waste sulphite liquor to the circulation cycle and continuously withdrawing the separated water vapor and gaseous sulphur dioxide all in a manner effective to maintain the concentration of the waste sulphite liquor contained in said reservoir at substantially the desired maximum concentration.

6. The method of concentrating waste sulphite liquor with recovery of sulphur dioxide which comprises continuously withdrawng waste sulphite liquor from a reservoir containing waste sulphite liquor maintained at substantially the desired maximum concentration and continuously forcing the withdrawn waste sulphite liquor to flow to spaced electrodes between which is maintained a difference in electrical potential whereby an electric current is caused to pass through the waste sulphite liquor flowing between and in contact with said electrodes thereby generating in the waste sulphite liquor the heat required for evaporative concentration, said heat being generated at a rate of less than 200 British thermal units per pound of liquor flowing between said electrodes, maintaining on the waste sulphite liquor flowing between and in contact with said electrodes a pressure in excess of the maximum vapor pressure of the liquor between said electrodes, continuing the flow of the heated waste sulphite liquor from said electrodes through a pressure regulating means, maintaining on the waste sulphite liquor leaving said pressure regulating means a vapor pressure less than the vapor pressure of the waste sulphite liquor entering said pressure regulating means to cause flash formation of water vapor and gaseous sulphur dioxide from the electrically heated waste sulphite liquor, continuing the flow of the heated waste sulphite liquor from said pressure regulating means to a vapor separating means effective to separate from the heated waste sulphite liquor the water vapor and gaseous sulphur dioxide formed by the electrically generated heat, and completing the circulation cycle by continuously returning the waste sulphite liquor remaining after the separation of water vapor and gaseous sulphur dioxide to the waste sulphite liquor contained in said reservoir, continuously bleeding off concentrated waste sulphite liquor from the circulation cycle and continuously adding dilute waste sulphite liquor to the circulation cycle and continuously withdrawing the separated water vapor and gaseous sulphur dioxide all in a manner effective to maintain the concentration of the waste sulphite liquor contained in said reservoir at substantially the desired maximum concentration.

7. The method according to claim 1 in which the dilute waste sulphite liquor which is continuously added to the circulation cycle is preheated before addition by indirect heat exchange with part of the water vapor and gaseous sulphur dioxide which is withdrawn.

8. The method according to claim 2 in which the dilute waste sulphite liquor which is continuously added to the circulation cycle is preheated before addition by indirect heat exchange with part of the water vapor and gaseous sulphur dioxide which is withdrawn.

9. The method according to claim 3 in which the dilute waste sulphite liquor which is continuously added to the circulation cycle is preheated before addition by indirect heat exchange with part of the water vapor and gaseous sulphur dioxide which is withdrawn.

10. The method according to claim 4 in which the dilute waste sulphite liquor which is continuously added to the circulation cycle is preheated before addition by indirect heat exchange with part of the water vapor and gaseous sulphur dioxide which is withdrawn.

11. The method according to claim 5 in which the dilute waste sulphite liquor which is continuously added to the circulation cycle is preheated before addition by indirect heat exchange with part of the water vapor and gaseous sulphur dioxide which is withdrawn.

12. The method according to claim 6 in which the dilute waste sulphite liquor which is continuously added to the circulation cycle is preheated before addition by indirect heat exchange with part of the water vapor and gaseous sulphur dioxide which is withdrawn.

LAURENCE R. BEATH.
HAROLD S. HILL.

No references cited.